(12) United States Patent
Bayer et al.

(10) Patent No.: US 11,644,090 B2
(45) Date of Patent: May 9, 2023

(54) HYDRODYNAMIC TORQUE CONVERTER

(71) Applicant: ZF Friedrichshafen AG, Friedrichshafen (DE)

(72) Inventors: Ewgeni Bayer, Sipplingen (DE); Peter Brielmaier, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/551,288

(22) Filed: Dec. 15, 2021

(65) Prior Publication Data
US 2022/0186817 A1 Jun. 16, 2022

(30) Foreign Application Priority Data
Dec. 16, 2020 (DE) ...................... 10 2020 216 031.7

(51) Int. Cl.
*F16H 41/30* (2006.01)
*F16H 45/02* (2006.01)

(52) U.S. Cl.
CPC .............. *F16H 41/30* (2013.01); *F16H 45/02* (2013.01); *F16H 2045/0215* (2013.01); *F16H 2045/0221* (2013.01)

(58) Field of Classification Search
CPC .......... F16H 41/30; F16H 45/02; F16C 19/10; F16C 19/44; F16C 33/6655; F16C 33/761
See application file for complete search history.

(56) References Cited

U.S. PATENT DOCUMENTS

| 5,407,041 A * | 4/1995 | Fukunaga | F16H 45/02 192/3.3 |
| 7,891,473 B2 * | 2/2011 | Maienschein | F16H 45/02 192/3.3 |
| 10,975,943 B2 * | 4/2021 | Mellet | F16D 25/0638 |
| 2007/0161454 A1 * | 7/2007 | Brown | F16H 57/08 384/620 |
| 2007/0235277 A1 | 10/2007 | Heuler et al. | |
| 2009/0285518 A1 * | 11/2009 | Fugel | F16C 33/4605 384/623 |

FOREIGN PATENT DOCUMENTS

| DE | 10 2007 005 999 A1 | 10/2007 |
| DE | 20 2006 020 596 U1 | 4/2009 |
| DE | 102015209335 A1 * | 11/2016 |

* cited by examiner

*Primary Examiner* — Stacey A Fluhart
(74) *Attorney, Agent, or Firm* — Finch & Maloney PLLC

(57) ABSTRACT

A hydrodynamic torque converter (1) with a converter torus formed by a pump wheel (3) and a turbine wheel (4) and a guide wheel (5). The guide wheel (5) is supported rotatably by a first axial bearing (51) and a second axial bearing (52). A sealing device (11), with a sealing gap, is provided in the area of the first axial bearing (51), which impedes a throughflow of the working fluid of the torque converter (1) through the first axial bearing (51).

9 Claims, 5 Drawing Sheets

HYDRODYNAMIC TORQUE CONVERTER

This application claims priority from German Application Serial No. 10 2020 216 031.7 filed Dec. 16, 2021.

FIELD OF THE INVENTION

The invention relates to a hydrodynamic torque converter with a converter torus formed by at least one pump wheel and a turbine wheel.

BACKGROUND OF THE INVENTION

Hydrodynamic torque converters are clutches that operate in accordance with the Föttinger principle. Owing to their virtually wear-free mode of operation, they are used in many technical fields for the transmission and/or transfer of rotational movements. These torque converters often comprise a converter lock-up clutch, also known as a bridging clutch for short. The said clutch serves to be able, when necessary, to bridge mechanically the otherwise hydrodynamic coupling of the converter. In that way, flow losses in the converter can be minimized.

In automotive technology, hydrodynamic torque converters are often used as a wear-free starting clutch and/or as an integral transmission shifting element. The torque converter is in such a case provided, in particular, on the input side or as a central shifting element of a multi-step motor vehicle transmission. Thus, the torque converter is connected to the transmission in a torque-transmitting manner. During the hydrodynamic operation of the torque converter, drive power is then transmitted by means of a working fluid of the torque converter. This takes place virtually with no wear, during which for the most part the working fluid takes up the loss-generated heat. Accordingly, the torque converter is often connected to a cooling system of the transmission and/or the motor vehicle. Heat energy, in particular, is produced in the hydrodynamic torus of the converter and from frictional work in the lock-up clutch.

From DE 20 2006 020 596 U1 a hydrodynamic torque converter with a lock-up clutch and a damper is known. In that case, a flow of oil over friction surfaces of the disks of the lock-up clutch is provided in order to improve the cooling of the disks. For this, the circulating oil flow in the area of the hydrodynamic structural elements of the converter (pump, turbine, guide wheel) should only flow in and out over the disks. For that purpose, an additional wall is attached on the side of the clutch piston that faces away from the pressure chamber of the piston.

DE 10 2007 005 999 A1 also discloses a hydrodynamic torque converter. In this case, leakage flows that worsen the cooling action and undesired frictional influences are to be avoided. For that purpose, a pressure chamber on the drive output side is delimited by the drive output side of the clutch piston and by a separating partition associated with the clutch piston. For its part, the said partition acts between the pressure chamber on the drive output side and a cooling space.

SUMMARY OF THE INVENTION

The purpose of the present invention is to improve upon the prior art. In particular, the torque converter should be simple to produce and should enable effective cooling.

This objective is achieved by the measures specified in the principal claim. Preferred embodiments emerge from the subordinate claims.

According to these, a hydrodynamic torque converter is proposed, which comprises at least one pump wheel and a turbine wheel and a guide wheel. The pump wheel, turbine wheel and guide wheel form a converter torus between them. In the converter torus, during the hydrodynamic operation of the torque converter, the working fluid of the converter is moved in a known way by a drive input torque applied to the pump wheel, whereby a corresponding output torque can be picked up from the turbine wheel.

In this case, the guide wheel is supported at least by a first and a second axial bearing so that it can rotate. In particular, the two axial bearings are arranged on either side of the guide wheel. Thus, the axial bearings rotatably support the guide wheel on both axial sides. In particular, only the said two axial bearings are provided for the guide wheel, so no further axial bearings are provided for the guide wheel. In particular, one or both axial bearings are in the form of purely axial bearings. The radial support of the guide wheel thus takes place differently. For radial support of the guide wheel, a separate radial bearing can be provided. This radial bearing can be in the form of a freewheel for the guide wheel.

In the torque converter, a sealing device with a sealing gap is also provided in the area of the first axial bearing. This sealing device inhibits the penetration of working fluid from the torque converter through the first axial bearing. In that way, the escape of working fluid out of the converter torus by way of the first axial bearing is prevented. An escape via the second axial bearing can then still be enabled or even intended. In that way, the guiding of the flow of working fluid in the torque converter can be improved.

It has been recognized that the possibility of working fluid flowing out of the torus via the two axial bearings is not always advantageous. In particular, it has been recognized that during the operation of the converter different pressure situations can arise in the area of the two axial bearings. Thus, it can happen that the working fluid heated in the torus flows out through the second axial bearing in a desired way. Part of this escaping working fluid, however, can undesirably flow back into the torus through the first axial bearing an axial distance away. This leads to an accumulation of heated working fluid in the converter. That brings a risk of overheating the converter and/or the working fluid. This is prevented by the proposed sealing device. The fluid guiding inside the converter can be optimized in that way.

Compared with an ordinary axial bearing, the said sealing device results is a substantially higher fluid resistance. In particular, the sealing device is designed such that the flow resistance in the area of the first axial bearing is substantially increased compared with the flow resistance in the area of the second axial bearing. Consequently, a much larger proportion of the outflowing working fluid escapes out of the torus through the second axial bearing than out of the first axial bearing.

It can be provided that the sealing device is designed to block completely any passage of working fluid through the first axial bearing. For this, a sealing element such as an X-ring or an O-ring can be arranged in the sealing gap of the sealing device. The sealing device can also be in the form of a pure gap seal with no contact. The sealing effect is then brought about by the pressure drop within the gap. The sealing device can also be designed to enable a small amount of working fluid to pass through the first axial bearing (very much smaller in relation to the second axial bearing). This can ensure adequate lubrication of the first axial bearing.

Preferably, the torque converter has a flow inlet. The flow inlet is designed to lead working fluid into the converter torus. In particular, cooled working fluid passes into the converter through the flow inlet. For this, the working fluid can previously pass through a cooler. The torque converter then also has a flow outlet. The outlet is designed to lead the working fluid out of the converter torus. To do this the working fluid passes through the second axial bearing. In particular, the sealing device selectively prevents the outflow from passing also through the first axial bearing.

The flow inlet and the flow outlet are in each case in the form of fluid lines. The inlet and outlet, in particular, enable flows separate from one another so that there is no appreciable mixing of the inflowing and outflowing working fluid. At least in part, the flow inlet and/or the flow outlet can be formed by gaps between structural elements of the converter.

Preferably, the flow outlet extends radially inside the guide wheel and the first axial bearing, and leads to a drive output side of the torque converter. On the drive output side, a connection opening can then be provided in the converter, through which working fluid can be let out of the converter. In this case, the drive output side of the converter is the side which delivers the drive output torque of the converter.

Preferably, the flow inlet extends radially inside the flow outlet and leads from the drive output side of the torque converter to a drive input side of the torque converter. The drive input side of the converter is the side to which the drive torque is applied. The drive input side can be, for example, coupled to a motor shaft of a drive motor in order to drive the torque converter. Thus the flow inlet extends, at least in part or completely, radially inside the flow outlet. In that way fitting space can be saved. In particular, the flow inlet and the flow outlet extend coaxially with one another, at least in part or completely.

The drive output side of the converter is, in particular, designed to be coupled to an input shaft of a transmission. This transmission input shaft can, therefore, be driven by the torque converter. Then, working fluid of the transmission, for example lubricating oil, can be used as the working fluid of the converter and can be passed into and out of the converter in a simple manner. The drive output side is the side facing toward the transmission.

Preferably, the torque converter also comprises a torsion damper and a lock-up clutch. The torsion damper serves to damp torsion fluctuations between the input side and the output side of the torsion damper, in particular such as those arising due to rotation irregularities of a drive motor on the drive input side. Thus, torsion fluctuations are not passed on to the output side, or only so in damped form. As explained at the start, the lock-up clutch serves to be able to bridge across the converter hydrodynamic coupling produced by the converter, by means of a mechanical coupling when necessary. When the lock-up clutch is fully engaged, the hydrodynamic power branch of the torque converter is bridged across (deactivated) in drive-technological terms, so that a torque applied to the converter on the input side is transmitted by way of the lock-up clutch to the output of the converter. When the lock-up clutch is fully disengaged, only the hydrodynamic power branch of the converter is activated, whereby a torque on the input side is transmitted to the output purely hydrodynamically. The lock-up clutch is, in particular, in the form of a frictional disk clutch. With the said disk clutch intermediate positions between the fully disengaged and fully engaged clutch positions can also be produced. In that case, the torque applied at the drive input side of the converter is transmitted to the drive output side of the converter partly via the lock-up clutch and partly hydrodynamically.

The torque converter is preferably designed such that working fluid passed in through the flow inlet first flows around the torsion damper and the lock-up clutch and then into the torus, and only then to the flow outlet. In this way the working fluid flows onto the said structural elements of the converter in that sequence. Thus, on one hand, heat is effectively extracted from the converter by the working fluid, and, on the other hand, the working fluid that first flows onto the torsion damper and the lock-up clutch is relatively cool, before the working fluid gets to the torus. This reduces the risk of overheating of the temperature-sensitive friction linings of the lock-up clutch.

Preferably, at least in a radially inner area the turbine wheel has no passage openings for the working fluid, in particular outflow openings. Then the turbine wheel has no passage openings in that area for the working fluid. In that way the flow inside the converter and the related extraction of heat can be further improved. In particular, this prevents (heated) working fluid from emerging from the converter torus through the turbine wheel and flowing to the lock-up clutch and/or the torsion damper.

In particular the torque converter also has a housing. In particular, the pump wheel and the turbine wheel and the torsion damper are arranged inside the said housing. In particular, the pump wheel is fixed on the housing. The turbine wheel can rotate relative to the pump wheel. The torque converter can transmit a torque hydrodynamically by way of the working fluid, from its drive input side to its drive output side. Depending on the design and operating point of the converter, it is also possible that the converter can increase the torque delivered on the drive output side compared with the torque applied on the drive input side, in particular by virtue of the guide wheel.

In particular, the housing of the converter comprises a first housing component, which accommodates blading of the pump wheel fixed onto it. This housing component is, in particular, a rear half of the housing (on the transmission side). In particular, the converter housing comprises a second housing component, which accommodates the torsion damper and the lock-up clutch. This housing component is, in particular, a front (motor-side) half of the housing. Thus, the housing is made essentially in two parts. In particular, the two said housing components are permanently connected to one another in a connection area, for example by welding.

Preferably, the first axial bearing comprises a first bearing ring and a second bearing ring. The two bearing rings have in each case at least one bearing surface. In this case, the sealing gap extends at least partially or completely at an angle relative to these bearing surfaces. This deflects the working fluid to the sealing gap, relative to the bearing surface. That further increases the flow resistance in the area of the first axial bearing and so too the sealing action of the sealing device.

The first axial bearing and/or the second axial bearing is/are in particular in the form of roller bearings. In particular, the first axial bearing and/or the second axial bearing are in the form of axial cylindrical roller bearings. The bearing rings then comprise the bearing surfaces for the roller bodies of the respective axial bearing. The bearing surfaces can even hold the roller bodies in position. Thus, the bearing surfaces are those surfaces of the bearing rings over which the roller bodies roll and which hold the roller bodies in position.

Preferably, the first axial bearing has a first bearing ring and a second bearing ring with bearing surfaces, wherein the sealing gap extends at least partially or completely parallel to the bearing surfaces. The construction of the sealing device can be thereby simplified.

Preferably, the first bearing ring of the first axial bearing is in contact with the guide wheel and is thereby supported on it. The second bearing ring is in contact with the housing of the torque converter and is thereby supported on it. Thus, the first axial bearing is arranged axially between the guide wheel and the housing, and the first axial bearing supports the guide wheel (axially) against the housing. The sealing gap can now be formed in part or completely between the first bearing ring and the housing. In other words, the sealing gap is then formed by the first bearing ring, on one side, and the housing, on the other side. The sealing gap can now also be formed partially or completely between the second bearing ring and the guide wheel. Then, the sealing gap is formed between the second bearing ring, on one side, and the guide wheel, on the other side. The sealing gap can also now be formed partially or completely between the guide wheel, on one side, and the housing, on the other side. The sealing gap can also be formed partially or completely between the first bearing ring and the second bearing ring. Then, the sealing gap is formed by the first bearing ring, on one side, and the second bearing ring, on the other side.

Preferably, the first bearing ring and/or the second bearing ring of the first axial bearing has a projection for forming the sealing gap. In this case the respective projection is clear of a bearing surface of the bearing ring. In other words, the projection is designed such that the sealing gap is formed thereby. The projection serves, in particular, purely for forming the sealing gap. Thus, the projection does not have any supporting function for the rolling bodies of the first axial bearing. In particular, the respective projection is arranged radially inside or outside the bearing surface of the bearing ring. The projection can form a radially inner or outer edge of the bearing ring. The projection can be formed on the bearing ring in the shape of a ring or a cylinder. Between the bearing surface and the projection there can be a step or a shoulder. The projection can stand out radially and/or axially from the bearing surface. Relative to the bearing surface, the projection can extend at an angle. In that case, the sealing gap is at an angle relative to the bearing surface.

Optionally, a motor vehicle transmission is also proposed which comprises the proposed hydrodynamic torque converter. The transmission has a transmission input shaft. By virtue of this, a drive input torque can be transmitted to the transmission. In this case the output of the torque converter is connected rotationally fixed to the said transmission input shaft, in particular with the converter arranged on the transmission input shaft. The motor vehicle transmission can be a multi-gear transmission. The transmission then has a plurality of selectable gear ratios by means of which, in each case, a torque applied on the drive input side can be transmitted after gearing to the drive output of the transmission. In other words, the proposed hydrodynamic torque converter is preferably specially designed to be fitted in a motor vehicle transmission. The transmission comprises, in particular, a transmission oil pump for conveying lubricating oil into the transmission. The lubricating oil of the transmission can then be used as the working fluid of the torque converter. In this case it can be provided that the transmission oil pump also conveys the lubricating oil through the torque converter.

In that way the lubricating oil is, in particular, also passed through the torque converter.

BRIEF DESCRIPTION OF THE DRAWINGS

Below, the invention is explained in greater detail with reference to the figures, from which further preferred embodiments of the invention emerge. The figures show, in each case schematically.

DETAIL DESCRIPTION OF THE PREFERRED EMBODIMENTS

In the figures, functionally equivalent structural elements are denoted by the same indexes.

Figure 1:
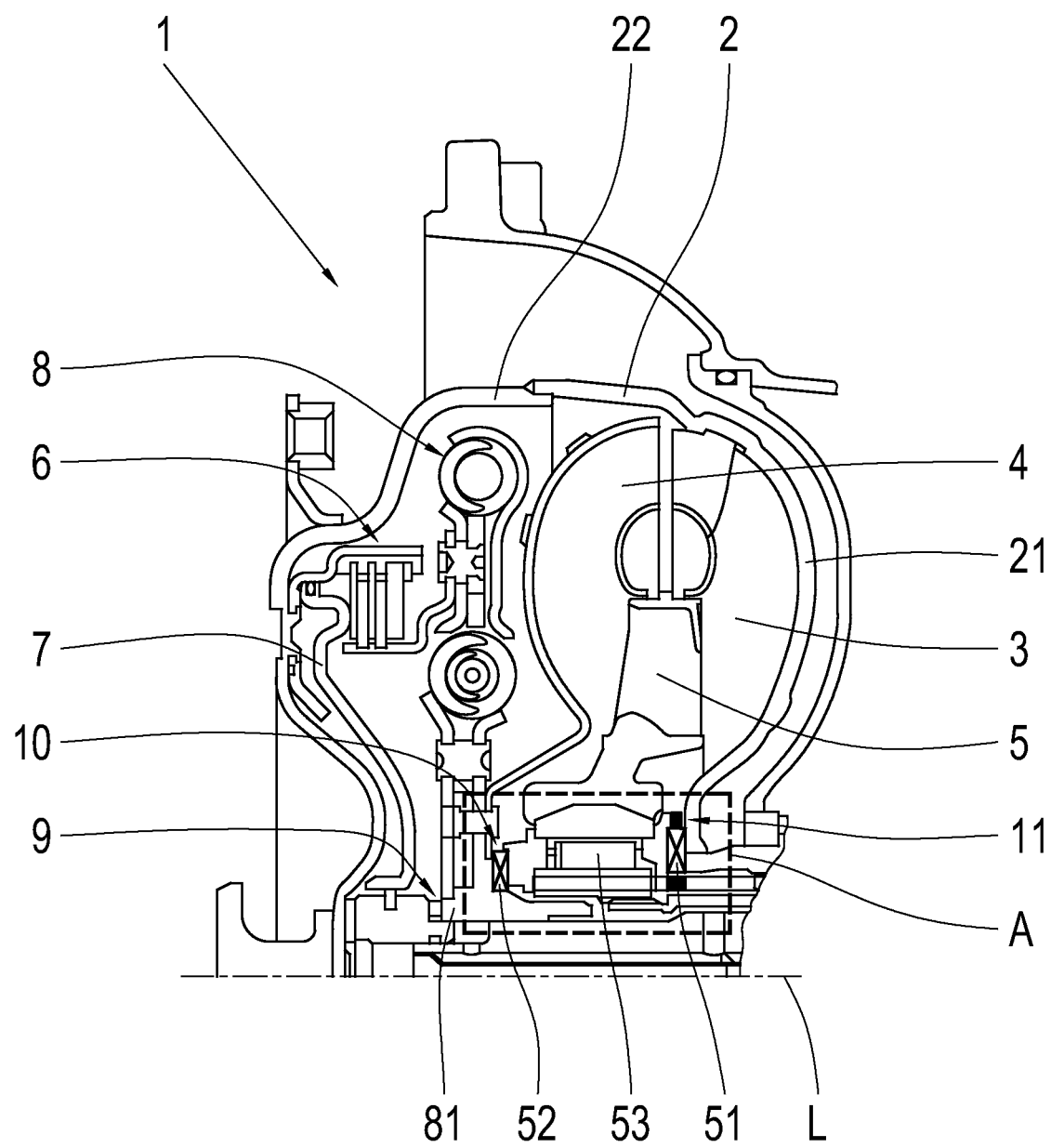
FIG. 1: A hydrodynamic torque converter.

FIG. 1 shows the upper half of a longitudinal section through a hydrodynamic torque converter 1. The lower half can be made as a mirror image thereof. The converter is, for example, arranged on the input side of a motor vehicle transmission (not shown). In a manner known as such, the converter 1 comprises a multi-component housing 2, a pump wheel 3 and a turbine wheel 4, as well as a guide wheel 5. The pump wheel 3 is an integral part of the rear (transmission-side) housing component 21, shown on the right in FIG. 1. For this, a blading is attached on the said housing component 21. Thus, this housing component 21 can also be called the pump part of the housing 2.

The pump wheel 3, the turbine wheel 4 and the guide wheel 5 together form the converter torus, within which the working fluid of the converter 1 circulates during the operation of the converter 1 so that a drive input torque applied on the housing 2 is hydrodynamically transmitted by the pump wheel 3 to the turbine wheel 4. This principle is known as the Föttinger principle and, therefore, needs no further explanation. In FIG. 1 the rotation axis of the converter is indexed L.

A lock-up clutch 6 is provided inside the front (motor-side) housing component 22, shown on the left in FIG. 1. The clutch 6 is in the form of a frictional disk clutch. The clutch 6 can be actuated by a piston 7 which can be hydraulically moved in the axial direction. The piston 7 is also arranged in the housing component 22. By means of the clutch 6, a drive input torque applied on the input side can be transmitted to the output of the converter 1, bypassing the hydrodynamic power branch of the converter 1. Depending on the contact pressure on the clutch disks of the clutch 6, a smaller or larger proportion of the transmitted drive input torque is thereby transmitted by the clutch 6 to the output of the converter 1.

When the clutch 6 is operating with slip and also when the clutch 6 is being engaged and disengaged, friction losses which take the form of heat occur in the clutch 6. This heat is very largely carried away by the working fluid that flows around the clutch 6 during the operation of the converter 1. The flow of the working fluid in the torus of the converter also generates heat, a considerable proportion of which passes into the working fluid and is carried away by it.

In addition, a torsion damper 8 is arranged inside the housing component 22. The purpose of the said damper 8 is to damp or eliminate rotation irregularities of the drive input torque applied at the input side, in particular when the clutch 6 is being used. A hub 81 serves as the output of the damper 8 and the converter 1. The hub 81 is arranged rotationally fixed on a transmission input shaft. The essential structure of such a damper 8 is also already known as such and, therefore, needs no further explanation.

The guide wheel 5 is rotatably supported in the axial direction, i.e., along the rotation axis L, by a first axial bearing 51 and a second axial bearing 52. In the radial direction, i.e., perpendicularly to the rotation axis L, the guide wheel 5 is in particular supported by a freewheel 53. In detail, the guide wheel 5 is rotatably supported by the first axial bearing 51, axially against the housing 2 (housing component 22). And the guide wheel 5 is rotatably supported by the second axial bearing 52, axially against the hub 81. In that way the guide wheel 5 is supported axially in both axial directions. The two axial bearings 51, 52 are preferably in the form of axial cylindrical roller bearings.

The converter 1 has a flow inlet and a flow outlet for the working fluid. Through the flow inlet the working fluid passes into the converter 1. The working fluid entering the converter 1 through the flow inlet is, in particular, previously cooled. The working fluid leaves the converter 1 through the flow outlet again. During the operation of the converter 1, owing to the above-described heat input the working fluid coming out is hotter compared with the working fluid coming in. Thus, in particular outside the converter 1 the working fluid coming out is cooled before it re-enters the converter 1, or before it is used in some other way, for example to lubricate the transmission.

Figure 2:
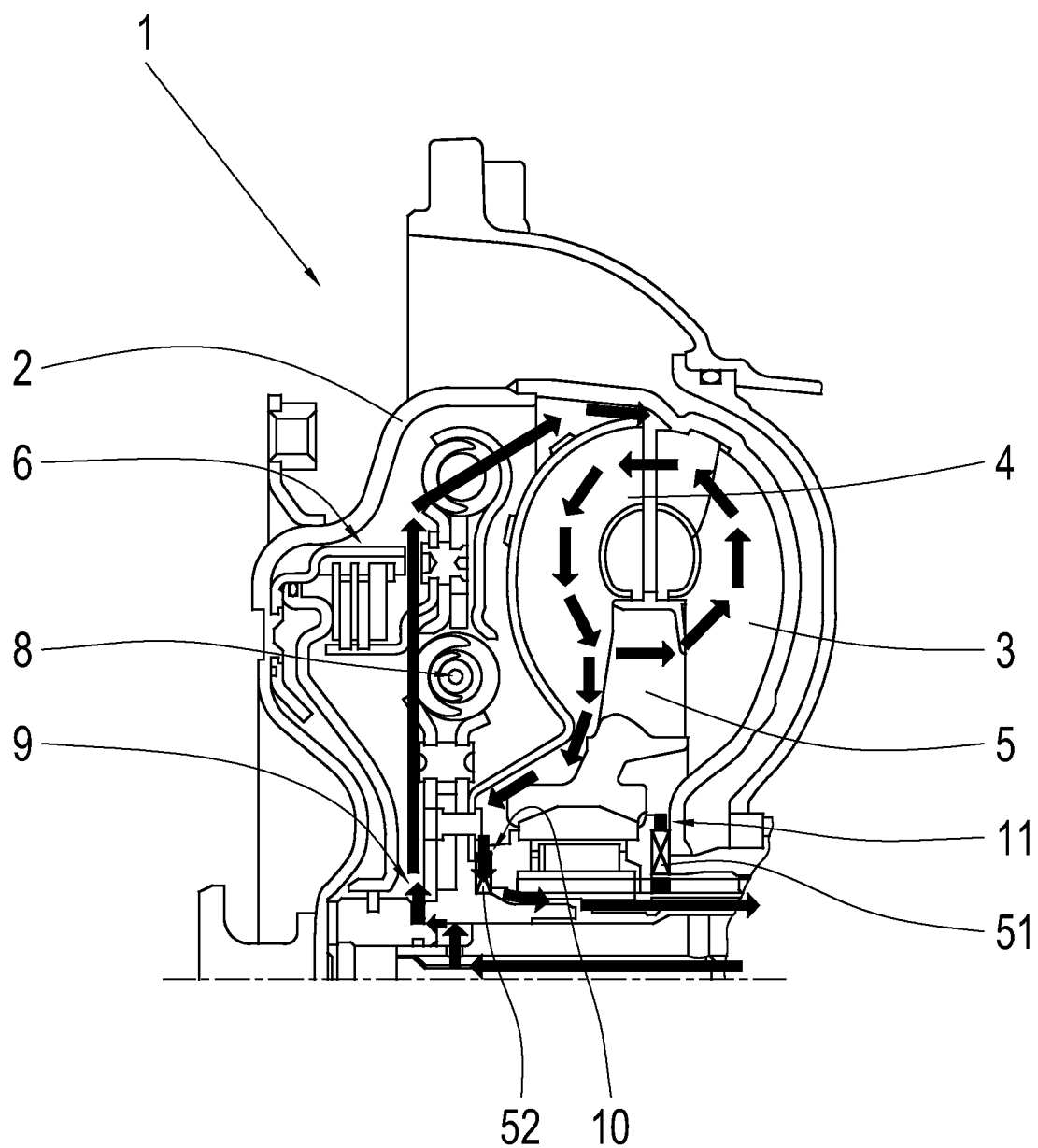
FIG. 2: An enlarged view of a first variant of the converter in FIG. 1.

FIG. 2 shows the main flow of the working fluid through the converter 1 shown in FIG. 1. For greater simplicity, in FIG. 2 only the essential indexes are indicated. From this it can be seen that the flow inlet extends radially inward through the transmission input shaft as far as the drive input side of the converter 1. In FIGS. 1 and 2, the drive input side is on the left-hand side of the converter 1. The converter can be coupled to a drive motor (not shown) on the drive input side. From FIG. 2 it can also be seen that the flow outlet extends radially outside the flow inlet and leads to the drive output side of the converter 1. In FIGS. 1 and 2, the drive output side is on the right-hand side of the converter 1. The drive output side faces toward the transmission.

In detail, the flow inlet extends through a flow inlet opening 9 of the converter 1, which is provided axially between the hub 81 and the piston 7. Thus, the working fluid freshly brought into the converter 1 first flows to the clutch 6 and the damper 8. Then, it flows radially outward into the converter torus formed by the pump wheel 3, the turbine wheel 4 and the guide wheel 5. The working fluid comes out of the torus through the radially inner outflow opening 10, which is part of the flow outlet. The second axial bearing 52, around which the emerging working fluid flows, is inside the outflow opening 10. Then the working fluid in the outflow is guided radially inward relative to the guide wheel 5 and the first axial bearing 51. The flow outlet extends radially on the outside relative to the flow inlet. Finally, the working fluid flows on to the drive output side of the converter 1 and out of the latter. A pump of the transmission can be used to maintain the fluid flow shown in FIG. 2.

To improve the flow situation in the converter 1, it can be provided that at least the radially inner area of the turbine wheel 4 has no passage openings for the working fluid. In the present case, this radially inner area extends between the fixing section of the turbine wheel 4, by which it is fixed onto the hub 81, and the radially farther-out converter torus. This can prevent relatively hot working fluid from passing out of the torus through the turbine wheel 4 back to the damper 8. It can also prevent relatively cool working fluid from the damper 8, from passing through the turbine wheel 4 to the flow outlet without flowing through the torus. In that way, the transport of the working fluid out of the torus is improved.

In the present case, it is provided that the first axial bearing 51 is remote from the flow outlet. The proportion of the working fluid that flows out of the torus by way of the first axial bearing 51 is minimized thereby. For this, a sealing device 11 is provided in the area of the first axial bearing 51. The sealing device 11 impedes the through-flow of working fluid through the first axial bearing 51. This prevents working fluid already present in the flow outlet from undesirably making its way back into the torus of the converter when, during the operation of the converter 1, different pressure exist at the bearings 51 and 52.

FIGS. 2 to 7 show various example embodiments of the converter 1 with the sealing device 11. FIGS. 2 to 7 show, in each case on an enlarged scale, the area outlined A in FIG. 1.

Figure 3:
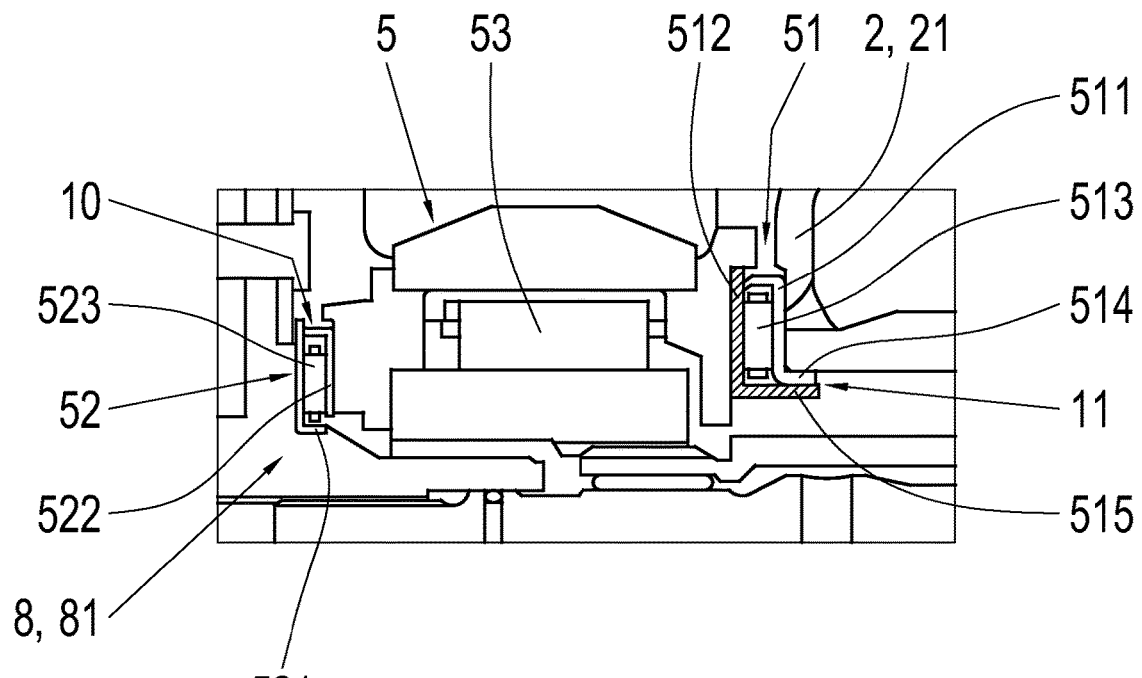
FIG. 3: An enlarged view of a second variant of the converter in FIG. 1.

In FIG. 3, the first and second axial bearings 51, 52 each have a first bearing ring 511, 521 and a second bearing ring 512, 522. Between the two bearing rings 511, 512 and 521, 522 are arranged roller bodies 513, 523. The roller bodies 513, 523 roll on bearing surfaces of the bearing rings 511, 512 and 521, 522 opposite one another.

In the first bearing 51, the first bearing ring 511 is in contact with the housing 2 of the converter 1 and the second bearing ring 512 is in contact with the guide wheel 5, and they are supported in that way. In the second bearing 52, the first bearing ring 521 is in contact with the hub 81 of the torsion damper 8 and is supported by it, and the second bearing ring 522 is in contact with the guide wheel 5 and is supported by it. The two bearings 51, 52 are arranged on two different sides of the guide wheel 5, so that they rotatably support the guide wheel 5 in both axial directions. Radially, the guide wheel 5 is supported by the freewheel arranged axially between the bearings 51, 52.

Axially between the hub 81 and the guide wheel 5 is the outflow opening 10. The second bearing 52 is inside the outflow opening 10. Thus, the second bearing 52 is in the outflow of the converter 1. Accordingly, the working fluid flowing out of the converter flows through the second bearing 52.

In contrast, the sealing device 11, which impedes the through-flow of working fluid through the said bearing, is provided in the first bearing 51. According to FIG. 3, the sealing device 11 consists of a cylindrical projection 514 on the first bearing ring 511 and a cylindrical projection 515 on the second bearing ring 512. The projections 514, 515 extend parallel to one another. The projections 514, 515 are angled (perpendicular) relative to the bearing surfaces of the bearing rings 511, 512. And the projections 514, 515 are arranged radially on the inside relative to the bearing surfaces of the bearing rings 511, 512. In this way, a sealing gap extending in the axial direction is provided between the projections 514, 515. Correspondingly, the sealing gap extends at an angle to the bearing surfaces of the bearing rings 511, 512. This sealing gap substantially increases the flow resistance for the working fluid at the first bearing 51 compared with the flow resistance at the second bearing 52. Thus, in any event a still smaller proportion of the working fluid in the torus flows out by way of the first bearing 51, whereas most of it flows out through the second bearing 52.

Figure 4:
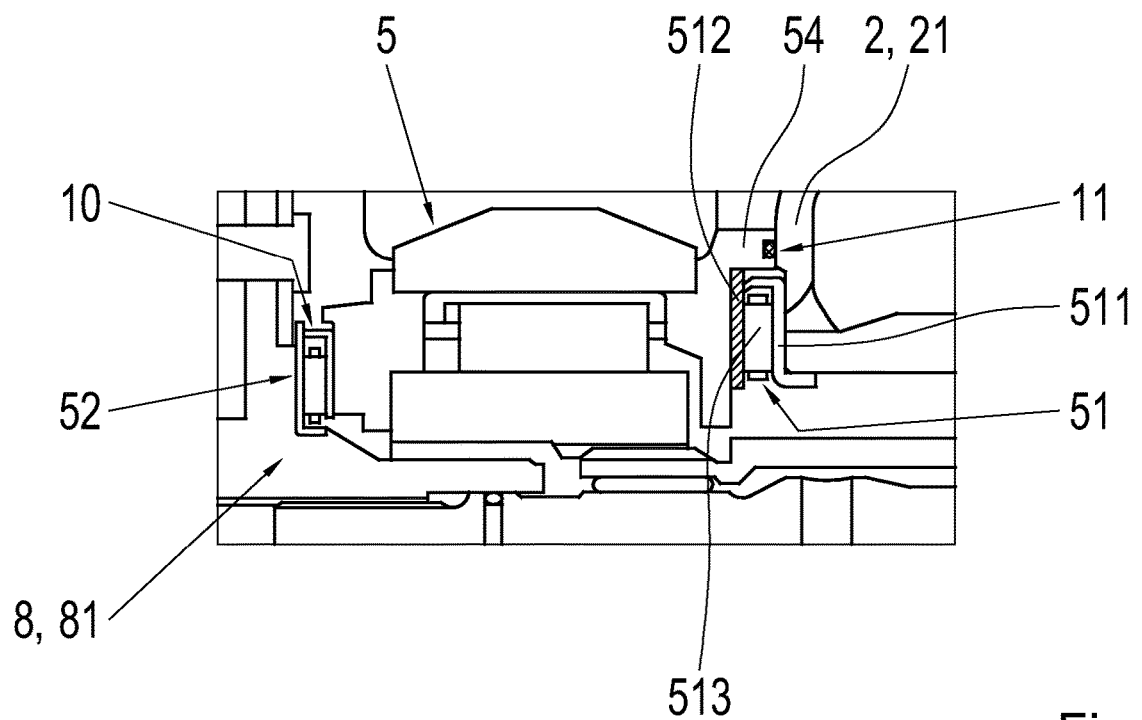
FIG. 4: An enlarged view of a third variant of the converter in FIG. 1.

FIG. 4 shows an alternative sealing device 11 in the area of the first axial bearing 51. The sealing device in FIG. 4 has an axially extending projection 54 on the guide wheel 5 radially on the outside relative to the bearing 51. Thereby, a sealing gap extending in the radial direction is formed between the guide wheel 5 and the housing 2 (housing component 21). Correspondingly, the sealing gap extends parallel to the bearing surfaces of the bearing rings 511, 512. In this case, a sealing element can be optionally provided inside the sealing gap. The sealing element can be held in an axially open groove of the projection 54 or of the housing component 21. The sealing element can be, for example, in the form of an O-ring or an X-ring. By virtue of the sealing element, a through-flow of working fluid out of the torus via the bearing 51 can be completely prevented. Since in this case the bearing 51 is only sealed on one side, working fluid can still be available from the other side for lubricating the bearing. For example, from the flow outlet, which extends radially inside relative to the first bearing 51 and is connected with the bearing 51 in a fluid-conveying manner, working fluid can still get to the bearing 51. With the design of the sealing device 11 shown in FIG. 4, the first axial bearing 51 can be made conventionally. In other respects, the explanations relating to FIG. 3 apply also to FIG. 4.

Figure 5:
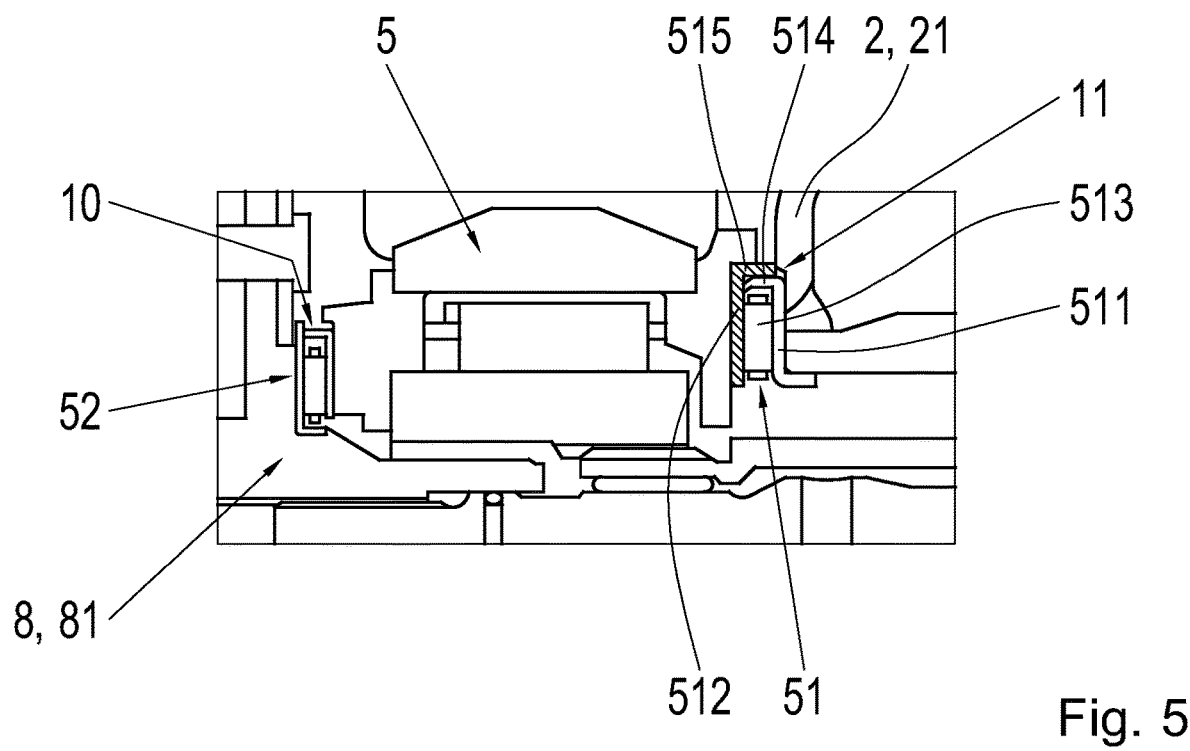
FIG. 5: An enlarged view of a fourth variant of the converter in FIG. 1.

The sealing device 11 shown in FIG. 5 differs from the sealing device 11 in FIG. 3 only in that the projections 514, 515 are arranged radially on the outside relative to the bearing surfaces of the bearing rings 511, 512. Consequently, the sealing gap extends, on the one hand, in the radial direction between the end of the projection 515 and the housing 2 and, on the other hand, the sealing gap also extends axially between the two projections 514, 515. In other respects the explanations relating to FIG. 3 apply also to FIG. 5.

Figure 6:
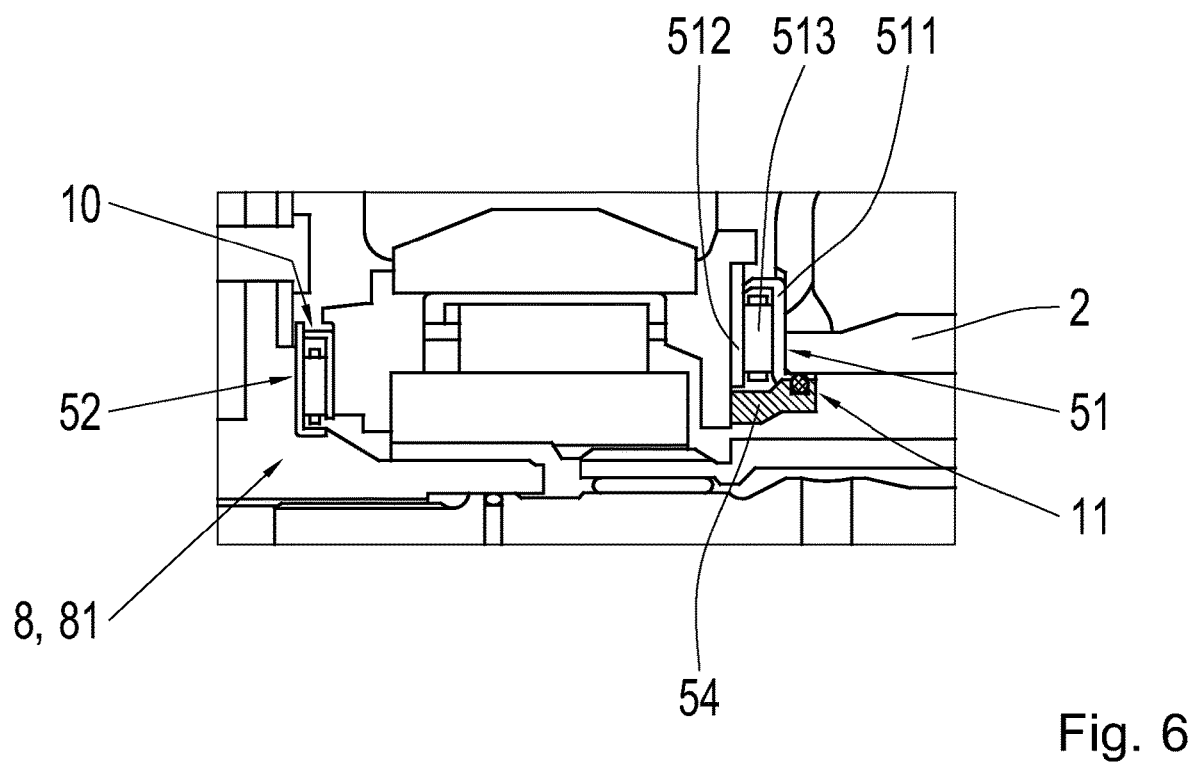
FIG. 6: An enlarged view of a fifth variant of the converter in FIG. 1.

The sealing device 11 according to FIG. 6 differs from the sealing device 11 in FIG. 4 in that the projection 54 of the guide wheel 5 is provided radially on the inside relative to the bearing 51. In addition, the sealing gap in this case extends axially between the projection 54 and the housing 2, which, at this point, is of tubular shape. The groove for the optional sealing element is, therefore, open radially toward the outside. In other respects the explanations relating to FIG. 4 apply also to FIG. 6.

Figure 7:
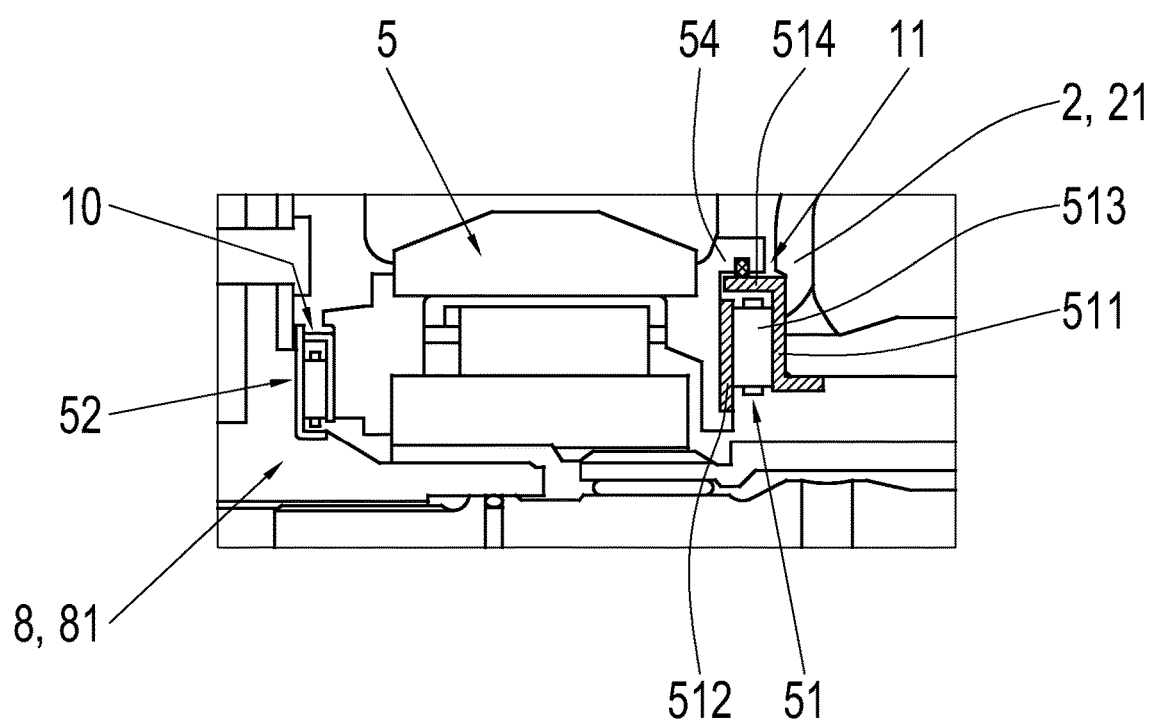
FIG. 7: An enlarged view of a sixth variant of the converter in FIG. 1.

The sealing device 11 shown in FIG. 7 is another version of the sealing devices 11 in FIGS. 4 and 5. It differs from them in that the axial projection 54 formed on the guide wheel co-operates with the angled projection 514 of the first bearing ring 511 to form the sealing gap. In this case, the sealing gap extends in the axial direction between the projection 54 on the guide wheel 5 and the projection 514 on the bearing ring 511. Here too, as shown in FIG. 7, the optional sealing element can be provided in the sealing gap, which element is then held in a groove. In other respects the explanations relating to FIGS. 4 and 5 apply also to FIG. 7.

INDEXES

1 Hydrodynamic torque converter
2 Housing
21 Housing component
22 Housing component
3 Pump wheel
4 Turbine wheel
5 Guide wheel
51 Axial bearing
511 Bearing ring
512 Bearing ring
513 Roller body
514 Projection
515 Projection
52 Axial bearing
521 Bearing ring
522 Bearing ring
523 Roller body
53 Freewheel
54 Projection
6 Converter lock-up clutch
7 Piston
8 Torsion damper
81 Damper hub
9 Flow inlet opening
10 Flow outlet opening
11 Sealing device
A Area
L Rotation axis, longitudinal axis

The invention claimed is:

1. A hydrodynamic torque converter with a converter torus formed by at least a pump wheel and a turbine wheel and a guide wheel, the guide wheel being rotationally supported by a first axial bearing and a second axial bearing,
   a sealing device being provided in an area of the first axial bearing, the sealing device having a sealing gap which impedes a through-flow of working fluid of the torque converter through the first axial bearing,
   a flow inlet through which the working fluid flows into the converter torus, and a flow outlet through which the working fluid is discharged out of the converter torus, and the second axial bearing being arranged in the flow outlet, and
   the first axial bearing comprises a first bearing ring and a second bearing ring with bearing surfaces, such that the sealing gap extends at least partially at an angle to the said bearing surfaces.

2. The torque converter according to claim 1, wherein the flow outlet extends radially inside the guide wheel and the first axial bearing and leads to a drive output side of the torque converter.

3. The torque converter according to claim 1, wherein the flow inlet extends radially inside the flow outlet and leads from a drive output side of the torque converter to a drive input side of the torque converter.

4. The torque converter according to claim 1, further comprising a torsion damper and a lock-up clutch,
   wherein the torque converter is designed such that the working fluid, passing through the flow inlet into the torque converter, first flows around the torsion damper and the lock-up clutch and then flows into the converter torus and then flows to the flow outlet.

5. The torque converter according to claim 1, wherein the first axial bearing comprises a first bearing ring and the second bearing ring with bearing surfaces, such that the sealing gap extends at least partially parallel to the bearing surfaces.

6. The torque converter according to claim 1, wherein the first bearing ring is in contact with and is supported by the guide wheel, and the second bearing ring is in contact with and is supported by a housing of the torque converter such that the sealing gap is at least partially:
   formed between the first bearing ring and the housing, and/or
   formed between the second bearing ring and the housing, and/or formed between the guide wheel and the housing, and/or formed between the first bearing ring and the second bearing ring.

7. A hydrodynamic torque converter with a converter torus formed by at least a pump wheel and a turbine wheel and a guide wheel, the guide wheel being rotationally supported by a first axial bearing and a second axial bearing,
- a sealing device being provided in an area of the first axial bearing, the sealing device having a sealing gap which impedes a through-flow of working fluid of the torque converter through the first axial bearing,
- a flow inlet through which the working fluid flows into the converter torus, and a flow outlet through which the working fluid is discharged out of the converter torus, and the second axial bearing being arranged in the flow outlet,
- the first axial bearing comprises a first bearing ring and a second bearing ring, and
- wherein the first bearing ring and/or the second bearing ring have projections for forming the sealing gap such that the projections are clear of a bearing surface of the bearing ring.

8. The torque converter according to claim 7, wherein the projection extends at an angle to the bearing surface of the bearing ring.

9. A hydrodynamic torque converter comprising:
- a converter torus having at least a pump wheel, a turbine wheel and a guide wheel;
- a first axial bearing being arranged on a first axial side of the guide wheel, and a second axial bearing being arranged on a second axial side of the guide wheel, the guide wheel being rotatably supported by the first and the second axial bearings;
- a flow inlet through which a working fluid flows to the converter torus, and a flow outlet through which the working fluid flows out of the converter torus;
- the second axial bearing being arranged in the flow outlet;
- a sealing device being arranged adjacent the first axial bearing, the sealing device having a sealing gap which at least substantially prevents the working fluid from flowing out of the converter torus past the first axial bearing, and
- the first axial bearing comprises a first bearing ring and a second bearing ring with bearing surfaces, such that the sealing gap extends at least partially at an angle to the said bearing surfaces.

* * * * *